Sept. 21, 1965   G. R. POUTOT   3,207,857
ELECTRODYNAMIC TRANSDUCER
Filed May 18, 1960

INVENTOR
GEORGES R. POUTOT

BY
AGENT

United States Patent Office 3,207,857
Patented Sept. 21, 1965

3,207,857
ELECTRODYNAMIC TRANSDUCER
Georges Robert Poutot, Fontenailles, France, assignor to North American Philips Company, Inc., New York, N.Y., a corporation of Delaware
Filed May 18, 1960, Ser. No. 29,872
Claims priority, application France, May 21, 1959, 795,204
8 Claims. (Cl. 179—100.41)

This invention relates to a vibrating system for use in a cutting head for manufacturing stereophonograph records or a stereo pick-up for such records in which two orthogonal surfaces are simultaneously cut or traversed by means of a single cutting tool or pick-up needle. The vibrating system of the invention more particularly comprises a magnetic circuit producing a homogeneous field within the useful gap of the circuit i.e. that portion of the gap within which the transducer operates. The transducer comprises two current conductors connected to a common member including the cutting tool or needle. Also, resilient means are provided which bias the transducer to a state of equilibrum or rest. Such devices, operating on the electrodynamic principle, may be employed for stereophonic sound recording or reproduction, to which end the transducer is provided with two separate current conductors, one for each of the two senses or directions of oscillations. In a known device of this kind the two current conductors are made in the form of a coil arranged on a coil holder, one coil being wound in a single direction, the other is wound, however, partly in one direction and partly in the opposite direction. With this method of winding and owing to the fact that the turns of the coils are co-planar to the component of the magnetic field, this device is suitable only for the 0°–90° system. A further disadvantage resides in that owing to the coils the moving mass of the vibrating system is proportionately very large.

The invention has for its object to provide a vibrating system which fulfills the various requirements of practice, particularly by a simplification of the system, while a higher-fidelity record or reproduction is obtained.

With the vibrating system according to the invention the current conductors each consist of a single current path, which paths are at right angles to each other. This has the advantage that the moving mass is very small and, for exmple in reproduction, division of the complex motion of the needle is given, not by the sense in which the coils are wound, but by the positions of the current paths themselves, which results in symmetry, so that the pair of orthogonal current paths may be employed not only for a 45°–45° system but, subsequent to a turn through 45° also in a 0°–90° system.

In a further embodiment of the device according to the invention the two current paths are arranged on a plate-shaped body, of which the main surfaces extend parallel to the gap boundary surfaces of the pole shoes. The plate-shaped body may be made from conductive material and by providing two pairs of opposite terminals the two orthogonal current paths are formed in the plate; alternatively, the plate may be made from insulating material, and may be covered in this case by two electrodes intersecting each other at right angles. According to a further feature of the invention the current paths may be formed by electrodes provided on a disc of insulating material so as to be displaceable.

The invention will now be described more fully with reference to the accompanying drawing, in which FIG. 1 shows a transducer of a vibrating system according to the invention, together with a cutting chisel and equilibrum restoring means such as coil springs.

FIG. 3b shows a side view of the vibrating system shown in FIG. 3a.

Figure 1:
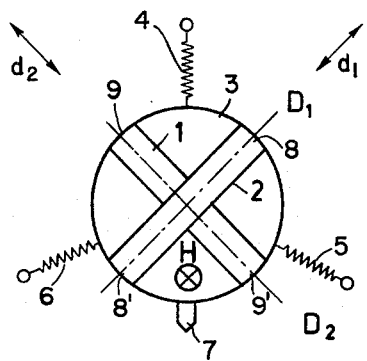

FIG. 1 serves for explanation of the principle underlying the invention. This figure shows two current paths 1 and 2, formed by flat electrodes of homogeneous, electrically good-conductive material, fastened rigidly to a disc 3 and extending at right angles to each other in two directions $D_2$ and $D_1$, which correspond to the two principle direction of oscillation, which may be made to represent or produce stereophonic signals.

Reference numerals 4, 5 and 6 designate the springs biasing the system into its state of equalibrium and holding, at the same time, the disc 3 in its plane.

A homogeneous, uniform field H is at right angles to the disc 3 and thus embraces the two current paths 1 and 2, while restoring forces proportional to the displacements in the directions $D_1$ and $D_2$ are exerted on the rigid assembly comprising the two current paths and the disc. It is evident that, when the current path 1 is traversed by a current having an intensity $I_1$ and the current path 2 by a current having an intensity $I_2$, displacements $d_1$ and $d_2$ respectively will occur in the directions $D_1$ and $D_2$ respectively, which are proportional to the current intensities $I_1$ and $I_2$ respectively under the action of the electrodynamic forces exerted on the said rigid assembly.

The current intensities $I_1$ and $I_2$, which are assumed to be proportional to the amplitudes of the oscillations from two separate suitably arranged sound sources, displace, together with the disc 3, a cutting chisel 7, which performs the stereophonic recording, so long as the average sense of the relative movements is in a direction lying in the plane of the disc 3.

It should be noted that the field H need not necessarily be at right angles to the plane of the disc 3; it will surffice if this field has a suitable component in the said direction.

A few details of the device according to the invention will now be described more fully.

It is quite unobjectionable for the said current paths to extend in the same conductive material. By means of a conductive disc, preferably being flat and of a uniform thickness, it is possible, by a suitable arrangement of terminals, to provide the two current paths in substantially orthogonal directions, so that the electrodes may be dispensed with. By means of a disc having a single axis of symmetry it is fairly simple to produce a current, by means of two terminals suitably arranged relatively to the axis of symmetry and suitably fed, coincident with the axis of symmetry. By means of a disc of uniform thickness, having two axes of symmetry which are at right angles to each other, and by means of two pairs of terminals 8, 8' and 9, 9', fed in a suitable manner and arranged, for example, at the ends of each of the axes of symmetry, the currents of the intensities $I_1$ and $I_2$ traverse, via these pairs of terminals, paths in this metal disc, which are substantially at right angles to each other.

The device shown in this figure is suitable for recording in the 45°–45° system; with a different arrangement of the current paths 1 and 2 with respect to the needle, a horizontal modulation and a vertical modulation (0°–90° system), or any other modulation in a different oblique direction may be obtained.

Figure 2:
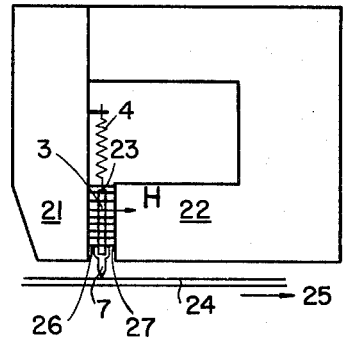
FIG. 2 shows a simplified side view of a cutting tool according to the invention.

FIG. 2 shows diagrammatically a side view of one embodiment of a recording device having a vibrating system according to the invention. Reference numerals 21 and 22 designate the pole pieces, producing a uniform field H inside a gap 23.

The flat disc 3, or transducer, which may be conductive, is moved in this field when traversed by the currents $I_1$ and $I_2$. The cutter 7 is directly arranged on the bottom side of the disc 3. The operative point thereof is connected with a wax disc 24, which moves in the direction of the arrow 25. In order to simplify the figure, only one of the resilient biasing means to return the transducer or disc 3 to rest position is shown. These restoring forces are proportional to the deviations from the rest position; this also applies to the connections via which the signals are fed to the disc 3. To this end flexible connections, for example twisted or coiled wires may be used, which involve only a negligible deformation of the disc motions. These connections may, as an alternative, coincide with the said elastic suspension means of the disc 3.

In the embodiment comprising a conductive disc traversed by currents in substantially orthogonal directions, the mechanical connection between the cutter and the transducer member may be particularly rigid, since the transducer or disc itself establishes this connection. It is, moreover, possible to arrange one or more terminals at suitable places on the said disc, to which voltages are applied and to which the deviations of the discs are proportional, whereby said terminals may be used as points of application for the restoring forces. The input and output terminals of said points of application, and the means providing a restoring force will, in this case, be arranged in the planes normally occupied by the supply wires for a conductive disc.

However, where separate restoring means and supply wires are utilized the restoring means is arranged at an angle to the said current supply wires or in which case it is advantageous to provide a phase-shifting system to allow adjustment of the restoring means.

The guide members for the disc and the restoring members may be constructed separately or be integral with each other. Where separately constructed, the disc 3 may be guided in its plane, for example, by the interposition of small cylinders or rods of material of resilient construction, arranged in the spaces 26 and 27 between the pole pieces 21 and 22, and the disc, while the main restoring forces are provided by suitably arranged springs. Thus, the rods or cylinders are deformed by movement of the transducer and the system restored by the springs.

If the natural resonance of the vibrating system lies within the audio-frequency range, damping may be obtained in accordance with the invention, by enclosing the vibrating system in an oil-filled container. In such an arrangement the restoring forces or elastic connections governing deflections of the cutter and of the supply wires may be made integral with the oil container.

Now an embodiment of the vibrating system according to the invention will be described in which the supply wires for the said current paths of a transducer serve simultaneously as guide members, suspension members and restoring means. It is assumed that the vibrating system is employed in a recording device (cutting tool) of which the cutter is substantially integral with the transducer.

In this embodiment it is furthermore assumed that the said transducer comprises orthogonal current paths arranged in a square plate of uniform thickness, which are energized at the diametrically opposite corners of the plate.

Figure 3A:
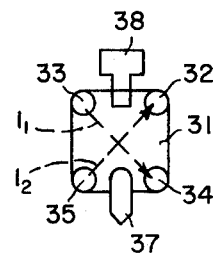
FIG. 3a shows a front view of a further embodiment of a vibrating system according to the invention.
Figure 3B:
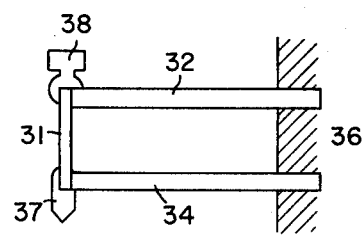

FIGS. 3a and 3b are a front view and a side view respectively of the vibrating system of the recording device in this form, i.e. the magnetic circuit is omitted for simplicity and clarity.

Reference numeral 31 designates the conductive plate in square form; 32–35 respectively designate guide cylinders the axes of which are at right angles to the plane of the plate 31 via which the currents $I_1$ and $I_2$ are conducted. The cylinders 32 to 35, are secured or anchored at 36, to hold the plate 31 in a given plane. These cylinders have sufficient elasticity to permit displacements of the plate for satisfactory recording. A cutter 37 is provided centrally on the bottom side of the plate 31.

In order to obtain satisfactory dynamics, a mass 38 is provided at the centre of the top side of the plate 31, which mass is equal to that of the cutter and is accurately arranged coaxially with the axis of symmetry of the latter. The mass 38 may be combined with a damping member, which is suitable for damping energy in excess of that for recording in the cutter plane.

The plate 31 is arranged in a magnetic field as seen in FIG. 2, which is at right angles to the plane of the plate; the cylinders 32 to 35 may be readily arranged on the outer sides of the pole pieces of the magnetic system producing the field. The cross sectional areas of the said cylinders are chosen in accordance with requirements of the current intensities to be passed therethrough and likewise with regard to restoring forces exerted on the disc. Members for damping the displacements, if hollow cylinders are used, may be arranged within the bores of the cylinders.

Within the scope of the invention many other embodiments are possible, both in the lateral-depth system and in the 45°–45° system or any other desired system.

Although the device is especially designed for record cutting purposes, the principle of the vibrating system may also be used for a pick up or scanning device for stereophonic records, if the cutter is replaced by a scanning needle.

What is claimed is:

1. A vibrating system for a stereophonic phonograph record cutting head and pick-up apparatus comprising magnetic means having pole faces for producing a homogeneous field within the gap defined by said pole faces, a plate-shaped element having linear orthogonal current paths within said gap, said element lying in a plane parallel with said pole faces, means mounting said element with the main surfaces thereof parallel with the gap defining surfaces of said magnetic means, means for restricting movement of said element within said plane and normal to the magnetic lines of force in said gap, means for biasing said element to a state of equilibrium in said plane, and electric current conductor means connected with said current paths.

2. A vibrating system according to claim 1 wherein said means for biasing said element and said electric current conductor means are integral.

3. A vibrating system according to claim 1 wherein said electric current conductor means and said means supporting said element are integral.

4. A vibrating system for a stereophonic phonograph record cutting head and pick-up apparatus comprising permanent magnetic means producing a homogeneous magnetic field within the gap thereof, a plate-shaped element of conductive material lying in a plane normal with the lines of flux in said gap, terminal means movably secured to the periphery of said element for defining orthogonal current paths therebetween, restoring means biasing said element to equilibrium within said plane, means movably supporting said element and restraining said element for linear movement within said plane, and current conductor means connected with said terminal means.

5. A vibrating system according to claim 4 wherein a single means comprises said restoring means, supporting means and said current conductor means.

6. A vibrating system according to claim 5 wherein said single means comprises a plurality of cylindrical means secured to said element substantially at the periphery thereof.

7. A vibrating system for a stereophonic phonograph record cutting head and pick-up apparatus comprising permanent magnetic means producing a homogeneous magnetic field within the gap thereof, a substantially plate-shaped element of conductive material operable within said gap, a plurality of resiliently mounted current conducting means secured to said element at equally spaced intervals thereabout to define orthogonal current paths therethrough, said last named means mounting said element with the main surfaces thereof in a plane normal with the flux lines in said gap and means restricting said element for linear movement within the said plane.

8. A vibration system for a stereophonic phonograph record cutting head and pick-up apparatus comprising permanent magnetic means having pole faces for producing a homogenous magnetic field within the gap thereof, an element supporting a pair of orthogonal current path means, each said current path means lying in a plane normal with the lines of flux in said gap, means moveably mounting said element for linear movement thereof within said plane, means for biasing said element to a state of equilibrium in said plane and electrical connections connected with said current path means.

References Cited by the Examiner

UNITED STATES PATENTS

| | | | |
|---|---|---|---|
| 1,799,799 | 4/31 | Jones | 179—100.41 |
| 2,240,918 | 5/41 | Vermeulen | 179—100.41 |
| 2,854,529 | 9/58 | Williamson | 179—100.41 |
| 3,040,136 | 6/62 | Grado | 179—100.41 |

OTHER REFERENCES

Audio, pages 30–32, August 1958, "Manufacture of a High Quality Cartridge."

IRVING L. SRAGOW, *Primary Examiner.*

STEPHEN W. CAPELLI, ELI J. SAX, *Examiners.*